United States Patent
Gilman et al.

(10) Patent No.: US 7,353,388 B1
(45) Date of Patent: Apr. 1, 2008

(54) KEY SERVER FOR SECURING IP TELEPHONY REGISTRATION, CONTROL, AND MAINTENANCE

(75) Inventors: Robert R. Gilman, Broomfield, CO (US); Richard L. Robinson, Broomfield, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 780 days.

(21) Appl. No.: 10/775,498

(22) Filed: Feb. 9, 2004

(51) Int. Cl.
H04L 9/00 (2006.01)

(52) U.S. Cl. .................................. 713/168
(58) Field of Classification Search ............... 370/218; 713/168–171, 176; 726/2–4
See application file for complete search history.

(56) References Cited

U.S. PATENT DOCUMENTS

| | | | |
|---|---|---|---|
| 4,288,659 A | 9/1981 | Atalla | 178/22.08 |
| 4,780,821 A | 10/1988 | Crossley | |
| 4,811,393 A | 3/1989 | Hazard | 380/21 |
| 4,888,800 A | 12/1989 | Marshall et al. | 380/21 |
| 4,937,863 A | 6/1990 | Robert et al. | |
| 5,157,663 A | 10/1992 | Major et al. | |
| 5,179,591 A | 1/1993 | Hardy et al. | 380/21 |
| 5,204,897 A | 4/1993 | Wyman | |
| 5,206,903 A | 4/1993 | Kohler et al. | |
| 5,230,020 A | 7/1993 | Hardy et al. | 380/21 |
| 5,260,999 A | 11/1993 | Wyman | |
| 5,307,481 A | 4/1994 | Shimazaki et al. | |
| 5,329,570 A | 7/1994 | Glassmacher et al. | |
| 5,341,427 A | 8/1994 | Hardy et al. | 380/21 |
| 5,347,580 A * | 9/1994 | Molva et al. | 713/159 |
| 5,386,369 A | 1/1995 | Christiano | |
| 5,390,297 A | 2/1995 | Barber et al. | |
| 5,408,649 A | 4/1995 | Beshears et al. | |
| 5,448,639 A | 9/1995 | Arazi | |
| 5,553,143 A | 9/1996 | Ross et al. | |
| 5,563,946 A | 10/1996 | Cooper et al. | |
| 5,671,412 A | 9/1997 | Christiano | |
| 5,699,431 A | 12/1997 | Van Oorschot et al. | |

(Continued)

FOREIGN PATENT DOCUMENTS

EP 1071253 1/2001

OTHER PUBLICATIONS

Info Merchant Store website, "VeriFone 2000, MS/DUKPT/STD Pin Pad, New" (printed Feb. 17, 2007), available at http://www.merchantamerica.com/creditcardterminals/index.php?ba=product_enlarge&product=9632, 1 page.

(Continued)

*Primary Examiner*—Matthew B Smithers
(74) *Attorney, Agent, or Firm*—Sheridan Ross P.C.

(57) ABSTRACT

A packet-switched communications device in an enterprise network is provided. The packet-switched communications device has a corresponding unique identifier, such as an address or extension. The device includes a processor operable to (a) establish a secure communications session with a key generating agent in the enterprise network; (b) provide, to the key generating agent through the session, the unique identifier of the communications device; and (c) receive, from the key generating agent through the session, a secret key and a key identifier. An application server authenticates the packet switched device using the secret key. After authentication is successful, secure communications is established between the packet switched device and the application server.

61 Claims, 6 Drawing Sheets

U.S. PATENT DOCUMENTS

| | | | |
|---|---|---|---|
| 5,708,709 A | 1/1998 | Rose | |
| 5,717,604 A | 2/1998 | Wiggins | |
| 5,742,757 A | 4/1998 | Hamadani et al. | |
| 5,745,576 A | 4/1998 | Abraham et al. | 380/25 |
| 5,745,879 A | 4/1998 | Wyman | |
| 5,758,068 A | 5/1998 | Brandt et al. | |
| 5,758,069 A | 5/1998 | Olsen | |
| 5,790,074 A | 8/1998 | Rangedahl et al. | |
| 5,790,664 A | 8/1998 | Coley et al. | |
| 5,828,747 A | 10/1998 | Fisher et al. | |
| 5,905,793 A | 5/1999 | Flockhart et al. | |
| 5,905,860 A | 5/1999 | Olsen et al. | |
| 5,940,504 A | 8/1999 | Griswold | |
| 5,960,085 A | 9/1999 | de la Huerga | |
| 5,978,565 A | 11/1999 | Ohran et al. | |
| 5,982,873 A | 11/1999 | Flockhart et al. | |
| 6,011,973 A | 1/2000 | Valentine et al. | |
| 6,023,766 A | 2/2000 | Yamamura | |
| 6,067,621 A | 5/2000 | Yu et al. | |
| 6,108,703 A | 8/2000 | Leighton et al. | |
| 6,128,389 A * | 10/2000 | Chan et al. | 380/247 |
| 6,134,660 A | 10/2000 | Boneh et al. | |
| 6,148,415 A | 11/2000 | Kobayashi et al. | |
| 6,163,607 A | 12/2000 | Bogart et al. | |
| 6,173,053 B1 | 1/2001 | Bogart et al. | |
| 6,192,122 B1 | 2/2001 | Flockhart et al. | |
| 6,314,565 B1 | 11/2001 | Kenner et al. | |
| 6,498,791 B2 | 12/2002 | Pickett et al. | |
| 6,502,079 B1 | 12/2002 | Ball et al. | |
| 6,513,121 B1 | 1/2003 | Serkowski | |
| 6,574,612 B1 | 6/2003 | Baratti et al. | |
| 6,584,454 B1 | 6/2003 | Hummel, Jr. et al. | |
| 6,675,208 B1 * | 1/2004 | Rai et al. | 709/224 |
| 6,765,492 B2 | 7/2004 | Harris | |
| 6,775,782 B1 | 8/2004 | Buros et al. | |
| 6,778,820 B2 | 8/2004 | Tendler | |
| 6,826,606 B2 | 11/2004 | Freeman et al. | |
| 6,850,958 B2 | 2/2005 | Wakabayashi | |
| 6,854,010 B1 | 2/2005 | Christian et al. | |
| 6,883,095 B2 | 4/2005 | Sandhu et al. | |
| 6,920,567 B1 | 7/2005 | Doherty et al. | |
| 6,928,166 B2 | 8/2005 | Yoshizawa | |
| 6,928,558 B1 | 8/2005 | Allahwerdi et al. | |
| 6,934,848 B1 | 8/2005 | King et al. | |
| 6,976,164 B1 | 12/2005 | King et al. | |
| 6,993,664 B2 | 1/2006 | Padole et al. | |
| 7,032,113 B2 | 4/2006 | Pendlebury | |
| 7,080,402 B2 | 7/2006 | Bates et al. | |
| 7,085,382 B2 | 8/2006 | Terao et al. | |
| 7,100,200 B2 | 8/2006 | Pope et al. | |
| 2001/0001268 A1* | 5/2001 | Menon et al. | 370/329 |
| 2001/0013024 A1 | 8/2001 | Takahashi et al. | |
| 2002/0017977 A1 | 2/2002 | Wall | |
| 2002/0038422 A1 | 3/2002 | Suwamoto et al. | |
| 2002/0052939 A1 | 5/2002 | Lee | |
| 2002/0083003 A1 | 6/2002 | Halliday et al. | |
| 2002/0087892 A1 | 7/2002 | Hideyo | |
| 2002/0099948 A1* | 7/2002 | Kocher et al. | 713/194 |
| 2002/0104006 A1* | 8/2002 | Boate et al. | 713/186 |
| 2002/0107809 A1 | 8/2002 | Biddle, et al. | |
| 2002/0112186 A1 | 8/2002 | Ford et al. | |
| 2002/0154777 A1 | 10/2002 | Candelore | |
| 2002/0164025 A1 | 11/2002 | Raiz et al. | |
| 2002/0176404 A1 | 11/2002 | Girard | |
| 2002/0188656 A1 | 12/2002 | Patton et al. | |
| 2002/0188704 A1 | 12/2002 | Gold | |
| 2003/0005427 A1 | 1/2003 | Herrero | |
| 2003/0013411 A1 | 1/2003 | Uchiyama | |
| 2003/0055749 A1 | 3/2003 | Carmody et al. | |
| 2003/0144959 A1 | 7/2003 | Makita | |
| 2003/0149874 A1 | 8/2003 | Balfanz et al. | |
| 2003/0208449 A1 | 11/2003 | Diao | |
| 2004/0044629 A1 | 3/2004 | Walker et al. | |
| 2004/0044630 A1 | 3/2004 | Walker et al. | |
| 2004/0044631 A1 | 3/2004 | Walker et al. | |
| 2004/0044901 A1 | 3/2004 | Serkowski et al. | |
| 2004/0054909 A1 | 3/2004 | Serkowski et al. | |
| 2004/0054930 A1 | 3/2004 | Walker et al. | |
| 2004/0073517 A1 | 4/2004 | Zunke et al. | |
| 2004/0078339 A1 | 4/2004 | Goringe et al. | |
| 2004/0103324 A1 | 5/2004 | Band | |
| 2004/0128551 A1 | 7/2004 | Walker et al. | |
| 2004/0162998 A1 | 8/2004 | Tuomi et al. | |
| 2004/0166878 A1 | 8/2004 | Erskine et al. | |
| 2004/0172367 A1 | 9/2004 | Chavez | |
| 2004/0181695 A1 | 9/2004 | Walker | |
| 2004/0181696 A1 | 9/2004 | Walker | |
| 2004/0199760 A1 | 10/2004 | Mazza et al. | |
| 2004/0260589 A1 | 12/2004 | Varadarajan et al. | |
| 2005/0086174 A1 | 4/2005 | Eng | |
| 2005/0202830 A1 | 9/2005 | Sudit | |
| 2005/0246098 A1 | 11/2005 | Bergstrom et al. | |
| 2006/0036894 A1 | 2/2006 | Bauer et al. | |
| 2006/0178953 A1 | 8/2006 | Aggarwal et al. | |
| 2006/0242083 A1 | 10/2006 | Chavez | |

OTHER PUBLICATIONS

VeriFone Inc. website, "VerfiFone Payment Solutions: Point-of-Sale PINpads" (1997-2004), available at http://www.verifone.com/products/printers_peripherals/html/pinpad_family.html, 1 page.

U.S. Appl. No. 10/811,412, Walker.

U.S. Appl. No. 10/947,418, Gilman.

U.S. Appl. No. 10/956,861, Robinson.

U.S. Appl. No. 11/051,316, Mazza.

ADTech Engineering, "IP Phone SI-160 User Manual (SCCP releases)," Version 1.2 (2002), pp. 1-20.

ARSYS, "Public Key Infrastructure," (Feb. 4, 2001), available at http://www.transactiontrust.com/technicaindex.html, 4 pages.

Articsoft Limited, "Public Key Infrastructure (PKI) FAQs" (Feb. 2, 2003), available at http://www.articsoft.com/wp_pki_faq.htm, 5 pages.

Clarke, Roger, "Centrelink Smart Card Technical Issues Starter Kit Chapter 7" (Apr. 8, 1998) at http://www.anu.edu.au/people/Roger.Clarke/DV/SCTISK.html, pp. 1-3.

Datakey, "Securing a Virtual Private Network withSmart Card Technology", Aug. 1, 2002; available at www.datakey.com, pp. 1-8.

"Digital Cinema Key Management Messages," Draft 1 (Aug. 8, 2002), pp. 1-9.

Discerning the Times Digest and Newsbytes, "Global Control of All Buying and Selling Now Possible," vol. 1 Iss. 1 (Jan. 2000), available at http://www.discerningtoday.org/members/Digest/2000Digest/January/Global%20Control.html, 2 pages.

Entrust Inc., "Entrust Authority Security Manager," (printed Aug. 13, 2004), available at http://www.entrust.com/authority/manager/index.htm, 23 pages.

Giswold, Robert S., "Get Smart: The Corning Revolution of Smart Cards," Journal of Property Management (May/Jun. 1997), 5 pages.

Infosec Engineering, "Building a Corporate Public Key Infrastructure" (1999), available at http://www.infoseceng.com/corppki.htm, 20 pages.

LockStream Corporation, "Catalyst DRM Service Platform" (printed Aug. 13, 2004), available at http://www.lockstream.com/products_spcm.php, 1 page.

LockStream Corporation, "Lockstream KeyDRM" (printed Aug. 13, 2004), available at http://www.lockstream.com/products_lgm.php, 2 pages.

LockStream Corporation, "Lockstream OMA 1.0 DRM Client" (printed Aug. 13, 2004), available at http://www.lockstream.com/products_sprm.php, 2 pages.

LockStream Corporation, Catalyst DRM Service Platform Architecture, Vers. 1.0 (Nov. 2003), pp. 1-28.

Microsoft Corporation, "Accessing a Smart Card" (Aug. 2002), available at http://msdn.microsoft.com/library/en-us/security/security/accessing_a_smart_card.asp, p. 1.

Microsoft Corporation, "Base Service Providers" (Aug. 2002), available at http://msdn.microsoft.com/library/en-us/security/security/base_service_providers.asp, p. 1.

Microsoft Corporation, "Building an ISO7816-4 APDU Command" (Aug. 2002), available at http://msdn.microsoft.com/library/en-us/security/security/building_an_iso7816_4_command.asp, pp. 1-2.

Microsoft Corporation, "Introducing Smart Cards to theSystem" (Aug. 2002), available at http://msdn.microsoft.com/library/en-us/security/security/introducing_smart_cards_to_the_system.asp, p. 1.

Microsoft Corporation, "Primary Service Provider" (Aug. 2002), available at http://msdn.microsoft.com/library/en-us/security/security/primary_service_provider.asp, p. 1.

Microsoft Corporation, "Smart Card Authentication" (Aug. 2002), available at http://msdn.microsoft.com/library/en-us/security/security/smart_card_authentication.asp, pp. 1-2.

Microsoft Corporation, "Smart Card Interfaces" (Aug. 2002), available at http://msdn.microsoft.com/library/en-us/security/security/smart_card_interfaces.asp, pp. 1-2.

Microsoft Corporation, "Smart Card Resource Manager" (Aug. 2002), available at http://msdn.microsoft.com/library/en-us/security/security/smart_card_resource_manager.asp, pp. 1.

Microsoft Corporation, "Smart Card Service Providers" (Aug. 2002), available at http://msdn.microsoft.com/library/en-us/security/security/smart_card_service_providers.asp, pp. 1.

Microsoft Corporation, "Smart Card User Interface" (Aug. 2002), available at http://msdn.microsoft.com/library/en-us/security/security/smart_card_user_interface.asp, pp. 1.

Microsoft Corporation, "Vendor Wrapper Service Providers" (Aug. 2002), avaiable at http://msdn.microsoft.com/library/en-us/security/security/vendor_wrapper_service_providers.asp, pp. 1.

MIT Laboratory for Computer Science, "The Cricket Indoor Location System," An NMS Project (printed Jul. 31, 2002), available at http://nms.lcs.mit.edu/projects/cricket/, 5 pages.

Motorola Press Release, "ERG Motorola Alliance Receives Award for Smart Card" (Jun. 6, 2000), available at http://motorola.com/LMPS/pressreleases/page88.htm, 3 pages.

NEC Infrontia Corporation Press Release, "Establishment of "SmartCardInfrontia" solutions for 'IC card'," (Mar. 13, 2002), 4 pages.

NetLingo Dictionary of Internet Words, "Smart Card" (1995-2004), available at http://www.netlingo.com/lookup.cfm?term=smart+card, 2 pages.

Novell®, "Certificate Server: Public Key Infrastructure," White Paper (1999), pp. 1-10.

Rankl, Wolfgang, "Smart Card Handbook," (Jun. 13, 2004), available at http://www.wrankl.de/SCH/SCH.html, 8 pages.

Russinovich, Mark, "Inside Encrypting Fily System, Part 1, "Windows & .NET Magazine (Jun. 1999), available at http://www.winntmag.com/Articles/Index.cfm?ArticleID=5387&Key=Internals, 4 pages.

Russinovich, Mark, "Inside Encrypting Fily System, Part 2, "Windows & .NET Magazine (Jul. 1999), available at http://www.winntmag.com/Articles/Index.cfm?ArticleID=5592&Key=Internals, 5 pages.

Security Config, Back Up Your Encrypting File System Private Key in Windows 2000 Download (Printed Aug. 13, 2004), avaiable at http://www.securityconfig.com/software/alerts/back_up_your_encrypting_file_system_private_key_in_windows_2000.html, 2 pages.

Smart Card Alliance Industry News, "Cubic Corp. Introduces New National Security and Homeland Defense" (Sep. 9, 2002), available at http://www.smartcardalliance.org/industry_news/industry_news_item.cfm?itemID=310, 2 pages.

Smart Card Alliance Industry News, "Cubic Introduces New Mobile Ticketing Machine" (Jul. 3, 2003), available at http://www.smartcardalliance.org/industry_news/industry_news_item.cfm?itemID=852, 2 pages.

SSH Communications Security Corp., "Enabling Virtual Public Networks with Public Key Infrastructure," White Paper (Jan. 2004), pp. 1-9.

Streetman, Kibbee K. et al., "Public Key Infrastructure: Resources, Requirements and Recommendations," ATI IPT Special Report 00-06 (Apr. 2000), pp. 145.

Sun Developer Network, "Smart Card Overview," Sun Microsystems, Inc. (1994-2004), avaiable at http://java.sun.com/products/javacard/smartcards.html, 2 pages.

Whatis.com Target SearchTM, "PKI" (Jan. 13, 2004), available at http://whatis.techtarget.com/definition/0,2989893,sid9_gci214299,00.html, 4 pages.

\* cited by examiner

Web Server

KEY SERVER FOR SECURING IP TELEPHONY REGISTRATION, CONTROL, AND MAINTENANCE

FIELD OF THE INVENTION

The present invention is directed generally to securing communications between any client-server or server-server and specifically to securing communications between an application server and a packet-switched telecommunications device.

BACKGROUND OF THE INVENTION

H.323 is a standard for packet switched multimedia communications. The standard provides for terminals that allow for any combination of multimedia communications, i.e., bi-directional audio and/or video and/or data communications. H.323 terminals include IP telephones or IP softphones. An IP telephone provides communications capability the same as analog or digital telephones provide except that communications are routed via the IP trunk card to the packet switched network rather than via an analog or digital trunk line. An IP softphone is a client-based telephony application for the desktop PC or laptop that has similar functionality as a desktop IP telephone.

The H.323 standard discusses the functionality required for interoperability between H.323 terminals and other ITU (International Telecommunications Union) standard terminals, including H.320 terminals operating on narrowband ISDN, H.321 terminals operating on broadband ISDN, H.322 terminals operating on ISOEthernet and H.310 terminals operating on asynchronous transfer mode (ATM). The H.323 standard provides for four functional units that may reside in a co-located system. Terminals are a first unit. A second unit, gateways, connects terminals on IP and circuit switched networks (ISOEthernet and ATM are virtual circuit switched networks). A third unit, gatekeepers, provides address resolution, registration of endpoints, admission control, monitor network resources and bandwidth, and maintain data integrity. The fourth unit, multipoint control units (MCU's), is designed to support multiparty conferencing.

A public branch exchange (PBX) is a telephone system that supports an enterprise (college, government office, business, etc.) to switch telephone calls between users within the enterprise. All enterprise users share external telephone lines, i.e., trunk lines, which saves the cost of requiring a line for each user to the telephone company's central office. PBXs have evolved from being proprietary hardware/software systems completely separate from the packet switched network to systems running on servers (now known as telephony servers or application servers), interoperable with other application servers through open standards and operating with the data network. Furthermore, application servers have evolved from strictly routing local and long distance telephone calls over the public switched telephone network (PSTN) to additionally providing the capability to route local and long distance telephone calls over packet switched data networks. These application servers operating on packet switched networks allow the enterprise to reduce costs by maintaining one network instead of two (the data and telephone) and reducing charges from toll calls by routing some calls over the packet switched network.

H.225.0 defines the call signaling (communications) protocol between a H.323 terminal and gatekeeper to perform the functions of registration, admission and status. The Registration, Admission and Status protocol (RAS) facilities the gatekeeper's management over H.323 endpoints (terminal, gateway, gatekeeper and MCU's) and their request for service. RAS uses an unreliable delivery mechanism, the User Datagram Protocol (UDP), which just makes a best effort to deliver data packets. Hence, there is a need to address the integrity of data within RAS packets and authentication of endpoints. H.225.0 defines the RAS protocol and provides security options for adding security to H.323 endpoints, such as, including authentication of endpoints, data integrity to ensure the packet data is not corrupted while in transit and privacy via data encryption.

Encryption and authentication of any form of communication may use either symmetric or asymmetric cryptography. With symmetric cryptography, a secret key is shared between two or more entities and typically is significantly longer than a PIN, password, or pass-phrase. This key is used to encrypt or sign messages sent by one entity and to decrypt or authenticate the signature of the received messages. In asymmetric cryptography, entities use one key (a private key), to encrypt or sign messages, and a second key (public key) is used to decrypt or authenticate the signature of the message.

H.225.0 RAS protocol supports various methods to allow the gatekeeper and endpoint to exchange messages and define the key exchange method used to initiate the call session. There are of course many ways to exchange keys. The key may be provided out-of-band, such as, manually administering a key in each particular host during manufacture or administration, or keys are sent between two endpoints via a local link. Alternatively, there are several well-known key management protocols, such as Rivest-Shamir-Adleman (RSA), Diffie-Hellman, Oakley, and Internet Security Association and Key Management Protocol (ISAKMP), Encrypted Key Exchange, Derived Unique Key per Transaction (DUKPT) and Kerberos. The first six key management schemes operate between 2 entities whereas the Kerberos scheme operates between 3 or more entities. Unfortunately, these seven well known key management protocols require either public key cryptography or pre-administration of a strong shared secret key during the registration process.

For example, authentication schemes for networked terminals, such as, Point of Sale Pinpad and Signature terminals use the DUKPT (derived unique key per transaction) method. The DUKPT method of key derivation is currently used by most Pinpad manufacturers and ATM machines. DUKPT is a key generation method where a large number of distributed terminals, such as, Point of Sale Pinpad and Signature terminals communicate with a central controller. A shared master secret key is stored in the controller and in the Point of Sale Pinpad or Signature terminal during the manufacturing or initial administration process. Thereafter, the Point of Sale Pinpad or Signature terminal and controller derive a transaction key for each communication which is calculated from the shared master key and non-secret transaction information, such as the terminal identification, transaction number and customer transaction information. All of this information, except for the customer's personal identification number (PIN), is sent in clear text. DUKPT provides protection such that knowledge of the key used in a previous transaction does not compromise future transactions. Unfortunately, DUKPT requires the preadministration of a secret key for all devices on the network.

FIG. 1A is an example of the current H.225.0 RAS registration method. At least one telephone system, the Avaya Communication Manager 10 (ACM) embeds the functions of the gateway and gatekeeper using software although such H.323 functionality could reside on separate servers. Alternatively, the functions of the gateway and gatekeeper can be performed by hardware or firmware. The ACM is an application server 10 as it requires an endpoint to authenticate itself before it can receive services as would be the case for packet switched devices, 16, 17 or other computer on an enterprise network.

The ACM 10 has a processor 6 and memory 7 which manages the switching of the calls within the ACM 10 and inbound and outbound calls. ACM 10 communicates via a packet switched network to H.323 terminals, such as, IP telephones 17 or IP softphones 16. Similarly, ACM 10 supports any other packet switched device that incorporates the H.323 terminal functionality, such as, a cell phone with IP telephony capability, wireless handset with IP telephony capability, or PDA with IP telephony capability.

ACM 10 also supports legacy analog and digital phones and facsimile machines via analog or digital station cards 2. An analog station card 2, or otherwise known as an analog port board, provides the support for the legacy analog telephones and facsimile machines. While a digital station card 2, or otherwise known as digital port board, provides the support for digital or ISDN desktop telephones.

Telephone calls can be routed over the PSTN using the analog or ISDN trunk boards 1 or over the local LAN using the IP trunk card 9 and LAN card 15. If calls are routed over the Internet 12, the messages are sent via the router 11.

The ACM hard disk-drive 5 stores the call processing and maintenance software; software to allow for administration either via the web or at an administrator's terminal using a graphical user interface or command line interface; configuration and user administered data, such as, extensions and user PINs; and software to perform the functions of a gatekeeper including RAS registration and software to perform the functions of the gateway.

Hardware and software on resource boards 3 provide resources such as dual tone multi-frequency (DTMF), tone generation, etc. Hardware and software on digital signal processing boards 14 provide resources for voice compression/decompression and packetization/depacketization of voice signals.

FIG. 1B shows the ACM 10 general registration scheme to register packet switched devices 16, 17. ACM 10 uses a H.323 challenge/response RAS procedure to authenticate the packet switched device 16, 17. Communication in the RAS channel is mostly in clear text except for the challenge strings that are specifically encrypted. The RAS procedure follows the general sequence:

In step 11, ACM 10 administration of the packet switched device 16, 17 includes administering the extension of each packet switched device 16, 17 and the extension's associated PIN. As part of the registration procedure, the packet switched device 16, 17 connects to an ACM 10 RAS (registration, admission, status) port previously configured on the packet switched device 16, 17. The packet switched device 16, 17 sends an H.323 gatekeeper request message, GRQ, with the packet switched device's 16, 17 extension as part of the message.

In step 12, the ACM 10 searches for the extension in the configuration data and finds the administered PIN for that extension. The ACM 10 uses a random number to build a challenge string of digits that is valid for a short period of time so that the packet switched device 16, 17 can not resend an earlier registration request message (or otherwise known as RRQ). The ACM 10 sends this challenge as part of a gatekeeper confirm message, GCF, to the packet switched device 16, 17. The ACM 10 performs the same computation the endpoint is performing.

In step 13, when the packet switched device 16, 17 receives the GCF message, the packet switched device encrypts the challenge string with a key derived from the packet switched device's PIN. The packet switched device 16, 17 computes the response to the challenge string using the PIN and sends the computed response as the result to the ACM 10.

In step 14, the ACM 10 verifies the response it received from the packet switched device 16, 17 is the same as the computed response in step 12. If correct, ACM 10 proceeds with the registration of the packet switched device 16, 17.

As is evident, the challenge string of digits is encrypted using a very weak key, the user's PIN, which is at most usually 4-8 digits. An intruder in the network may easily guess the user's PIN. Additionally, the intruder may easily try all possible PIN combinations to find the PIN that produces the same response for a particular challenge. Furthermore, the information sent between the ACM 10 and packet switched devices 16, 17 is in clear text except for the encrypted challenge string in the message. Even after the packet switched device 16, 17 is registered with the ACM 10, the information sent via the H.225.0 call-signaling channel between the packet switched device 16, 17 and ACM 10 is in clear text. Hence, unsecure communications over the communication channel may compromise information such as credit card numbers when sent via a packet switched device 16, 17. Similarly, the weak key does not ensure proprietary information such as file downloads to the packet switched device 16, 17 or user administrative settings, such as, telephone settings remain private and/or authenticated.

SUMMARY OF THE INVENTION

These and other needs are addressed by the present invention. The present invention is generally directed to a packet-switched communications device that is operable to effect provisioning and/or registration using key information received from an application server. As used herein, a "key" refers to a sequence of symbols used with a cryptographic algorithm for encrypting and decrypting data, "encryption" refers to the act of converting information in a first form into a second form that is a code or cipher, "decryption" refers to the act of converting the information in the second form back into the first form, "provisioning" refers to the act of distributing a unique, (secret) typically symmetric, key to a networked computational component as part of component installation at the location of end use, and "registration" refers to the act of authenticating the packet-switched device prior to admitting the packet-switched device to communication via the network. As will be appreciated, provisioning occurs after the device has been shipped to the customer or end user and occurs on the customer's or end user's premises. Provisioning does not refer to installation of keys in the factory or by an intermediate entity before installation in the customer's network or where the device will be used.

In one embodiment, the invention provides a system and method for securing communications between a packet-switched device, such as an IP telephone, IP softphone, or any other networked communication device, such as a computer acting either as a client or server, registering with an application server (which may be for example a gatekeeper or media server). In the preferred embodiment, a key generating agent, which may or may not be collocated with or resident in the application server, includes security software to generate and provide at least one unique secret key to the packet-switched communications device and the application server.

A secret key distribution and registration process occurs after the packet-switched communications device powers up or resets. The key generating agent generates a unique secret key and one or more key identifiers associated with the secret key. The secret key generated by the key generating agent includes a large number of digits and is a function including an associated identifier, also known as a "key identifier" or "generator." The associated identifier can be derived from information not uniquely identified with the packet switched device for example, a pseudorandom number, a database of keys and key identifiers, a hash function, etc. Alternatively, the associated identifier may be computed using information uniquely identified with the packet switched communications device, such as a user's PIN, password, name, and/or other personal information and/or the device's address (such as the MAC or IP address), extension, serial number, and the like. The key generating agent provides the secret key and the associated identifier to the packet-switched communications device after establishing a secure communication. The packet-switched communications device provides the associated identifier to the application server. The application server provides the associated identifier to the key generating agent after establishing trusted communications with the key generating agent. The key generating agent provides the secret key to the application server and the application server uses the secret key and associated identifier to authenticate the packet switched device securely instead of depending solely on an extensions's PIN as the key, which is much less secure. After the registration process is complete, on-going communications between the packet switched device and the application server are secure based on a strong symmetric key.

In another embodiment, the application server can be collocated with the key generating agent and is injected with a seed from which a large enterprise key is derived by the key generating agent. This is affected during administration and component installation. Before registering with the application server, the packet-switched communications device contacts the key generating agent, establishes a private data communication, and receives a strong, unique, device-specific secret key and a key identifier, also referred to as a "generator". The device-specific key is unique and may be derived using the generator and the enterprise master key.

Using this invention, the loss of a secret key provides no advantage to a would-be hacker in determining either the enterprise master key or other device-specific keys. Once the device has a device-specific key and generator, it can securely register with the application server and secure signaling channels as well as receive encrypted data using the device-specific key. Examples of such data include maintenance and download information. This methodology does not require that the communications device have prior knowledge of any keys in the key generating agent.

Additionally, the use of the invention does not require a shared-secret key downloaded into the packet switch device (or client or server) as part of the installation or administration. Instead, a shared secret key is sent to the packet-switched device as part of the provisioning process. Hence, the communication channel between the packet switched device and the application server becomes a secure communications channel without preprovisioning a strong key and without using public key cryptography. These and other advantages are apparent from the discussion below.

DETAILED DESCRIPTION

Figure 2A:
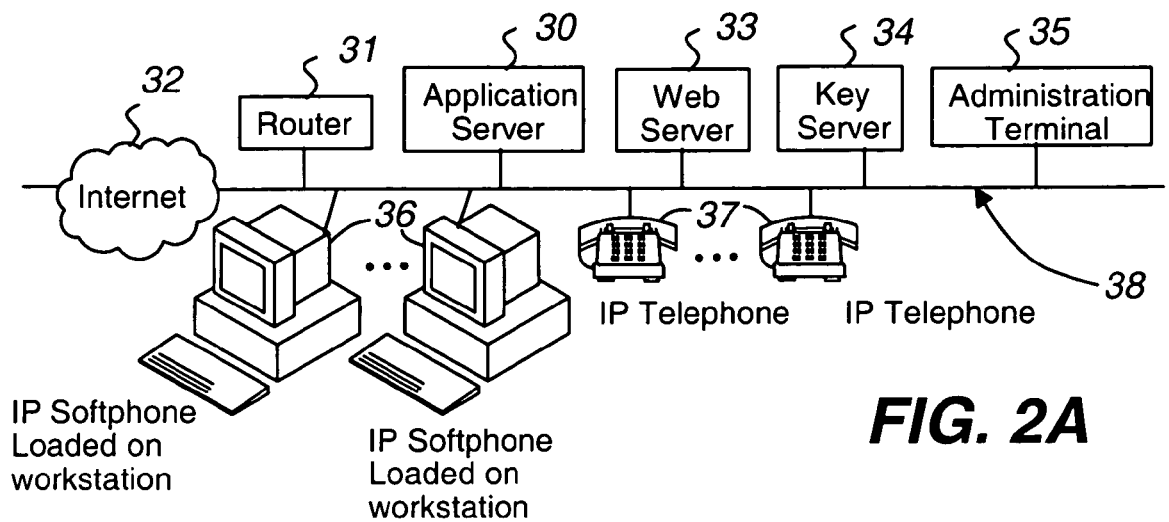
FIG. 2A is a block diagram according to an embodiment of the present invention.

FIG. 2A is a block diagram of the present invention. Note the same reference numbers are used in different figures to designate the same components. FIG. 2A includes an application server 30, key generating agent 42, which is stored in the key server 34 hard disk-drive 42 independent of the application server, web server 33, administration terminal 35 and packet switched devices, such as, IP telephones 37 or IP softphones 36, network 38, and router 31.

The packet switched device 36, 37 can be any H.323 or SIP (Session Initiation Protocol) compliant terminal or any networked computer acting either as a client or server. H.323 terminals or SIP terminals of which an IP telephone is one example, may provide real-time bidirectional audio, video and data communications. Packet switched devices can also include a cell phone with IP capability, wireless handset with IP capability, or PDA with IP telephony capability.

Additionally, the packet switched device 36, 37 stores telephone configuration (script) files and software files to interface and communicate with the key server 34 during the key distribution process and the application server 30 during the registration process. For example, the packet switched device nonce, Re, is a random number generated by the packet switched device to provide registration sequence replay protection. Re includes 128 bits.

In the preferred embodiment, the packet switched device has the capability to request and receive files via HTTP and hence has software stored in its memory to interface with a web server 33 or any server that utilizes the HTTP protocol. The packet switched device 36, 37 may use other methods to send and receive information or files to the application server 30 and key server 34 other than HTTP, such as, file transfer protocol (FTP) or trivial file transfer protocol (TFTP). Preferably, information and files are sent in a protocol understood by the packet switched device 36, 37, the application server 30, the key server 34, web server 33 and administration terminal 35.

Figure 1A:
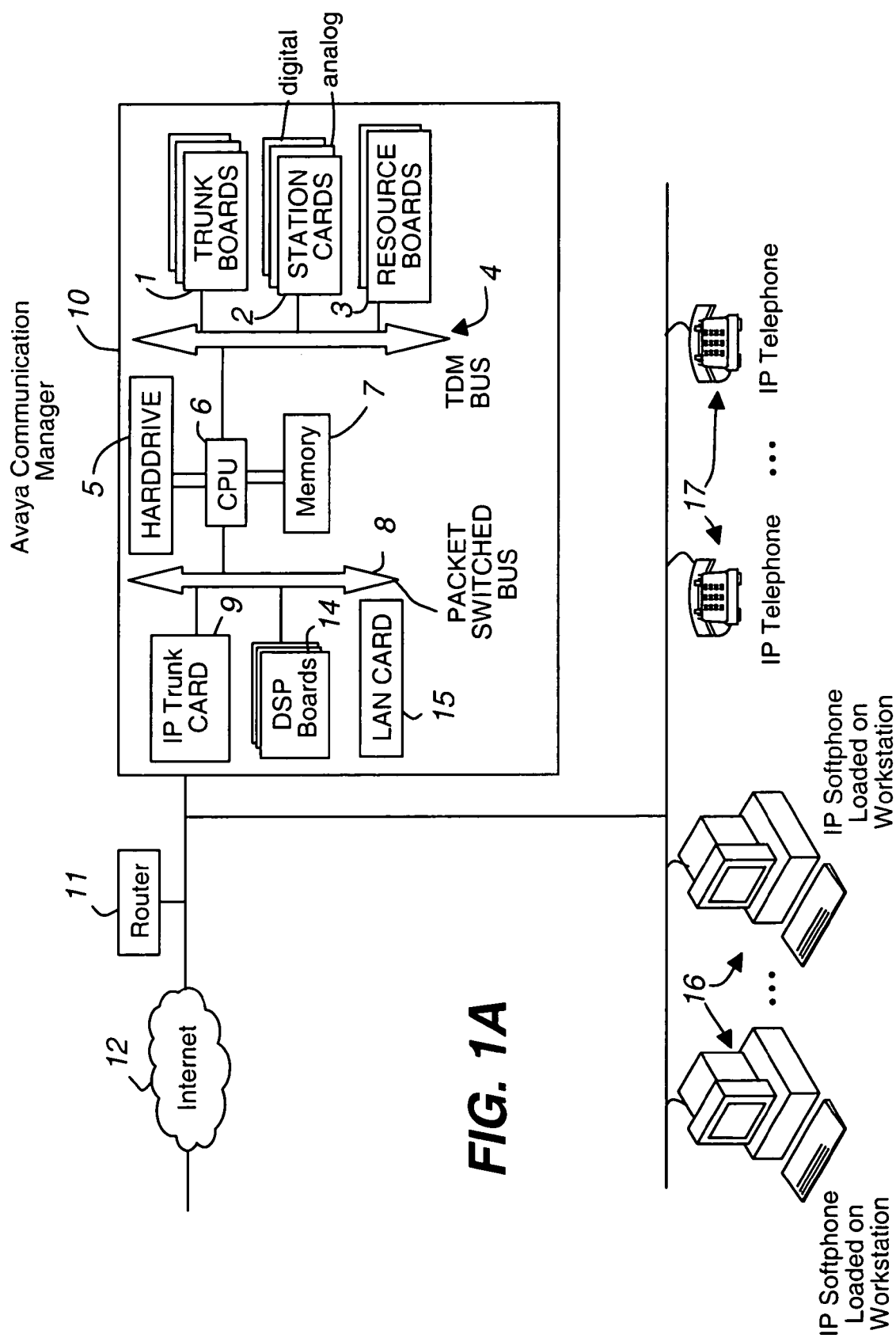
FIG. 1A is a block diagram of the prior art system.
Figure 1B:
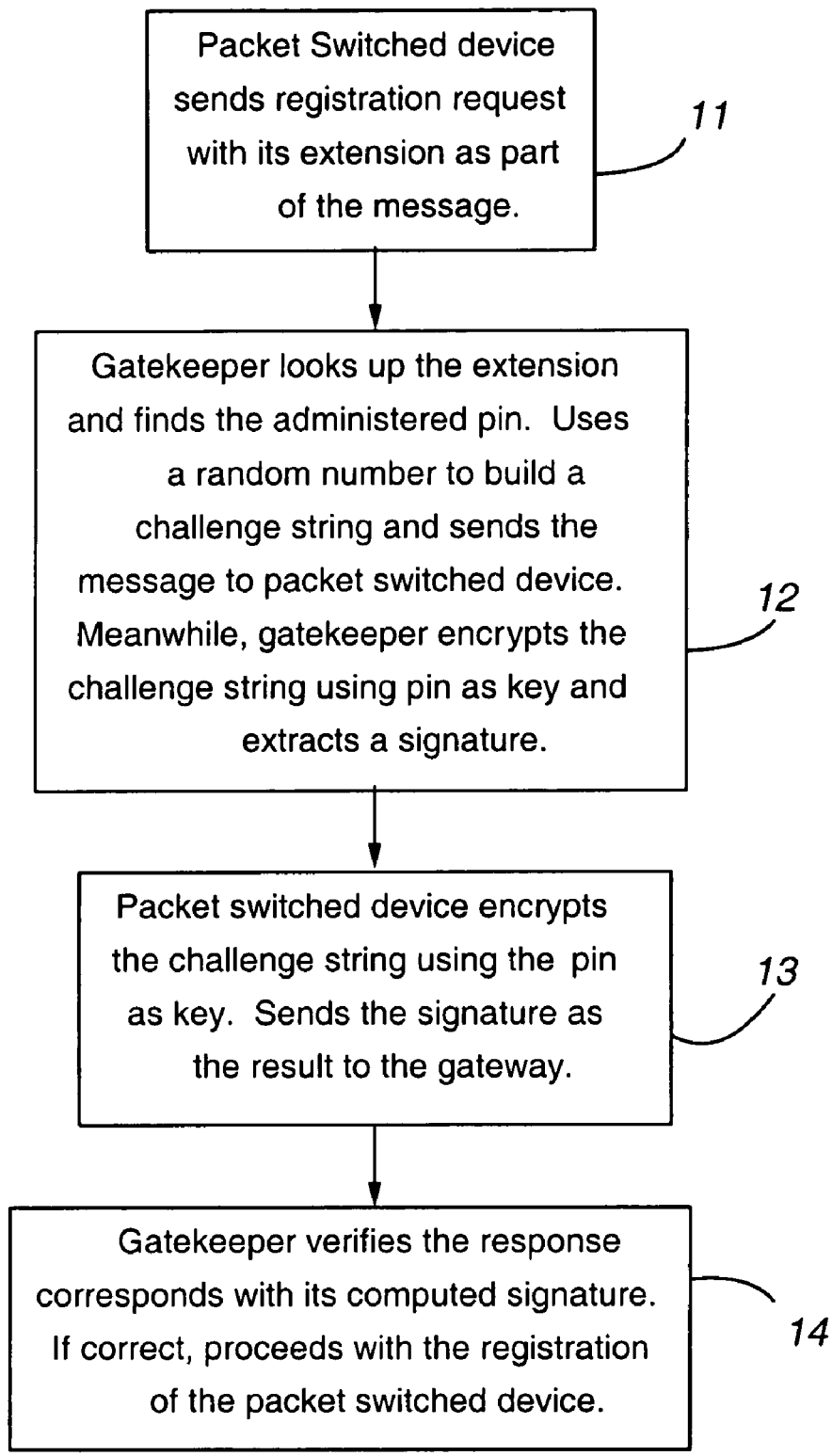
FIG. 1B is a flow chart of the prior art packet switched device registration scheme.

Application Server 30 is similar to application server 10, the ACM, in FIG. 1A. However, application server 30 now includes the security software and protocols to interface and communicate with the key server 34 during the key distribution process and during the novel registration process with the packet switched device 36, 37. For example, application server 30 includes security software to create the application server 30 nonce, Rg, a random number generated to provide registration sequence replay protection during the registration process. Rg includes 128 bits.

Additionally, the application server 30 has a web-based administration process which provides a secure HTTP connection between the application server 30 web browser, the Secure Web Service on the web server 33 and the administration terminal 35 web browser.

The application server 30 in this invention is not limited to a telephony server with H.323 gatekeeper and gateway functionality, such as the ACM. This invention also operates in the SIP environment where the application server is known as a SIP proxy server and the endpoints are SIP endpoints. The application server 30 can be any SIP proxy server that provides similar gatekeeper functions as in the H.323 standards. As of this moment, the SIP standard does not incorporate the concept of the gateway in its standard, that is, connecting terminals on IP and circuit switched networks. Instead, the gateway functionality is incorporated as needed into the product implementing the SIP standard. Furthermore, the invention as described uses H.323 messages but the invention is equally operable for other standards regarding packet switched multimedia communications, such as, SIP which would require the use of SIP based messages. Finally, an application server 30 is defined as requiring an endpoint to authenticate itself before it can receive services as would be the case for packet switched devices, 36, 37 or any endpoint requesting data from the application server 30, etc. Hence, the application server 30 can be a media server that provides video and phone services, or any type of audio, video and data service etc.

This registration process takes a packet switched device 36, 37 that historically had a weak key due to the small number of digits in its PIN and uses Key server 34 to generate stronger keys and an associated key identifier to improve the registration process by protecting and demonstrating knowledge of the PIN or other identifier associated with the packet switched device 36, 37. Thereby allowing the packet switched device 36, 37 to register with the application server 30 in a secure communications environment. Secure communications is defined as communications where messages are encrypted, integrity checked and at least one endpoint is authenticated. Hence following registration, on-going communications between the packet switched device 36, 37 and the application server 30 is encrypted and integrity checked and the packet switched device is authenticated using a strong shared secret. Compromise of one packet switched device 36, 37 or one symmetric key does not compromise the security of any other packet switch device's 36, 37 key and hence this novel registration process prevents out-of-band attacks.

In this process for securing packet switched device registration, the network 38 has at least one packet switched device 36, 37 and an application server 30 that may or may not be coresident with a key server 34. Communications between the packet switched device 36, 37 and the key server 34 is secure and the packet switched device 36, 37 authenticates the key server 34. One method to establish secure communications is by the use of public key cryptography, such as certificates, however, use of this novel registration process does not require packet switched device 36, 37 specific digital certificates. Instead, a copy of a server certificate issued by a root certificate authority or a copy of the issuing authority certificate may be downloaded as firmware to the packet switched devices 36, 37 during manufacture or during initial administration.

Communications between the key server 34 and application server 30 are trusted and are achievable by similarly using certificates. Trusted communications is defined as communications where messages are encrypted, integrity checked and endpoints are mutually authenticated. The key server 34 and application server 30 can be initially administered with a server certificate issued by a root authority or a copy of the issuing authority certificate may be downloaded as firmware during manufacture or during initial administration.

The communication between the packet switched device 36, 37 and the application server 30 is secure. The application server 30 does not need to use public key cryptography to authenticate the packet switched device 36, 37 but uses symmetric key cryptography. The application server 30 has knowledge of the packet switched device's 36, 37 PIN or other identifier associated with the packet switched device due to the administration process.

Following the establishment of secure communications, a key server 34 communicates with the packet switched device 36, 37 to provide one unique symmetric (secret) key and associated key identifier for a particular extension. The key server 34 provides the key to the application server 30 for a particular extension after trusted communications are established.

Once the application server 30 has the key from the key server 34, the registration process proceeds. The registration function of the application server 30 authenticates the packet switched device 36, 37 before the packet switched device can communicate with another packet switched device 36, 37. Once registration is complete, a secure communication channel between the packet switched device 36, 37 and the application server 30 is established.

The System Administrator uses the administration terminal 35 to administer both the application server 30, the key server 34, and any other servers as needed, such as, web server 33 or router 31. The administrator uses a secure HTTP connection (e.g., HTTPS) via the administration terminal 35 web browser to administer the various servers. Although, the administration terminal 35 may use other secure means and a graphical user interface (GUI) or command line interface to administer the various servers.

Figure 2B:
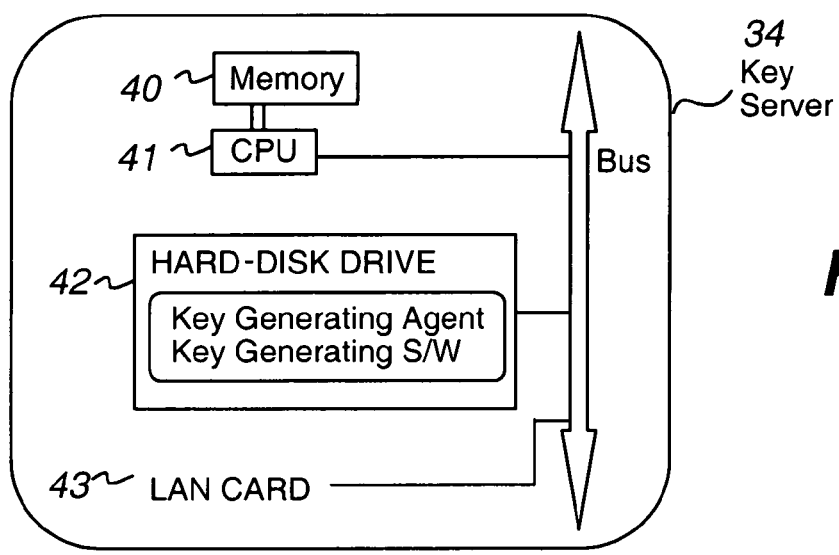
FIG. 2B is a block diagram of the key generating agent according to an embodiment of the present invention.

FIG. 2B is a block diagram of the key server 34. The key server 34 includes a CPU 41, LAN card 43, such as Ethernet network card, memory 40 and hard disk-drive 42 to store software, keys and associated identifiers. All of these elements communicate via a data bus. The key server hard disk-drive 42 stores the key generating software that includes the three following security functions:

1. Key generating agent Process: The Key generating agent process supports key generation services for the application server 30 and the Key File Generation process. The Key generating agent uses a cryptographically secure pseudorandom number generator (PRNG) to compute the Enterprise Master Key although other methods exist. The pseudorandom number generator can be based on secure hash algorithms, such as, SHA-1. To provide information required to generate pseudorandom numbers, the Key generating agent is initialized with a number of bits which is known as a "Seed" that is used to generate the Enterprise Master Key, Km. The Enterprise Master Key, Km is used to generate the Packet Switched Device Master Key, Kg, or otherwise known as the secret key. A person skilled in the art will recognize other alternative equations are available to compute Km for single or multiple key servers 34, for example, Km can be calculated as Km=SHA-1(S) where Km includes 160 bits.

Each Kg is a unique value used to derive other Session Keys and a unique Kg is sent to each packet switched device 36, 37 that requests a secret key from the Key generating agent. Kg, is identified by its key identifier, generator(g), and derived from g and Km. A person skilled in the art will recognize a variety of equations are available to compute Kg, for example, Kg=HMAC-SHA-1-128 (g,Km) where Kg includes 128 bits.

Key generator, g, is a unique key identifier for each Kg, and is incremented after each Kg issues. Generator, g, includes 128 bits. The Key generating agent randomly chooses the starting value of g referred to as $g_0$. To insure uniqueness, $g_0$ includes a field that is unique to the specific Key generating agent, such as its IP address or the MAC address of the server the Key generating agent is resident on, and may include another field unique to the packet switched device 36, 37, such as its extension, EXT, or serial number, MAC address, etc. There is additionally a counter field of sufficient length to avoid wraparound within a long period of time.

The Packet Switched Device Authentication Key, Ka, is used to digitally authenticate messages between the application server 30 and the packet switched device 36, 37. Ka is derived from Kg, a constant and the user's PIN. A person skilled in the art will recognize a variety of equations are available to compute Ka, for example, Ka=HMAC-(SHA-1)-128(Kg, Ca||PIN) where Ca is a constant and Ka includes 128 bits.

The Enterprise Master Key Check Value, CVm, is determined by using the lowest three least significant bytes of the following calculation: CVm=SHA-1(Km). A person skilled in the art will recognize alternative equations to compute CVm. CVm may be exchanged between packet switched devices, 36, 37 to confirm that both devices use a Kg based on the same Km.

The Integrity Check Value, ICV, is an optional element in H.323 registration, authentication and status messages for authentication of message contents. In the preferred embodiment, Ka is used as the key to the hashed message authentication code and one formula that may be used to compute ICV is, for example, ICV=HMAC-(SHA-1)-96. Refer to HMAC as defined in RFC 2104 for other formulas.

The Session Pre-Master Secret, Ks, is used as the transport layer security (TLS) pre-master secret for establishment of a TLS session or as key material to encrypt information exchanged between the application server 30 and the packet switched device 36, 37 within the H.225.0 signaling channel. Ks may be computed as follows: Ks=HMAC-(SHA-1)-128 (Kg, Cb||PIN||Re||Rg), where Cb is a constant and Ks includes 128 bits. A person skilled in the art will recognize other alternative equations to compute Ks.

If the Key generating agent is not located on the key server 34 or on the same server operating the Key File Generation Process then the Key generating agent process should have secure access to the server operating the Key File Generation Process.

2. The Key File Generation Process: This process obtains key information from the Key generating agent and formats it into a file, the Key File, which is in the format required by the packet switched devices 36, 37 and application server 30. Kg is unique for each packet switch device key request, hence Key Files are generated dynamically. The Key File Generation Process must have secure access to the Key generating agent process and to the Secure File Service process that resides on the web server 33. Alternatively, the Secure File Service process resides on the key server 34 or on the application server 30. If secure access is not possible, the Key File could be generated directly by the Key generating agent Process.

3. The Key generating agent web-based administration software: In the preferred embodiment, the Key generating agent is administered through a secure HTTP connection between the administration terminal 35 and the key server 34. The administrator on the administration terminal 35 administers the Key generating agent process by establishing secure HTTP communications with the Secure Web Service residing on the web server 33 and the Key generating agent web-based administration software residing on the key server 34. Note, a web server 33 is not required. Any secure administrative mechanism will work, such as secure shell (SSH).

Figure 2C:
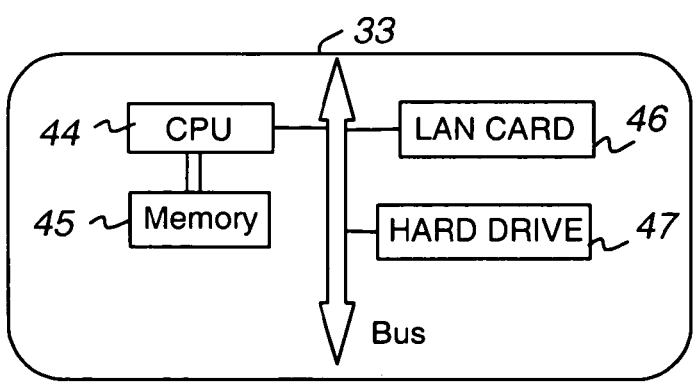
FIG. 2C is a block diagram of the web server according to an embodiment of the present invention.

FIG. 2C is a block diagram of the web server 33. The web server 33 includes a CPU 44, LAN card 46, such as, Ethernet, memory 45 and a hard disk-drive 47. The web server 33 hard disk-drive 47 stores administration pages and the software to implement the following four functions:

1. Secure Web Service Administration software for the application server: This software includes the libraries and associated software to administer the application server 30 from the administrator's terminal browser 35 via the Secure Web Service, a secure HTTP connection, on the web server 33.

2. Secure Web Service Administration software for the key server: This software includes the libraries and associated software to administer the key server 34 from the administrator's terminal browser 35 via the Secure Web Service, a secure HTTP connection, on the web server 33.

3. Secure File Service: This is an HTTP server process that utilizes the TLS (HTTPS) protocol to encrypt data requested by packet switched devices 36, 37, such as configuration (script) files. Basic Secure File Service operation supports packet switched devices 36, 37 reading (not writing) of data. Basic Secure File Service operation also supports authentication of the file service by the packet switched device 36, 37. Where the packet switched device 36, 37 authenticates the Secure File Service by authenticating the web server 33 certificate chain against a Root Certificate built into the packet switched device's operating software. Note the Basic Secure File Service does not authenticate the packet switched device or the end user. If a file exists, the file is delivered to any endpoint that requests it.

Basic Secure File Service also supports dynamic files, that is, content generated on demand by a process. Basic Secure File Service supports passing of parameters, such as a packet switched device 36, 37 extension, EXT, from the URL of the HTTP GET message requesting the file to the process that generates the file. The packet switched device 36, 37 extension, EXT, is one example of a parameter to identify the packet switched device 36, 37. Other examples may include serial number, user log in id, etc.

Advanced Secure File Service, supports mutual authentication of the application server 30 and the key server 34. Additionally, Advanced Secure File Service supports application server 30 writing of files subject to limitations on file size, number of files, and file naming conventions, etc. The allows the application server and the Advanced Secure File Service of the key server to share information securely whereby the application server retrieves information from the key server necessary to authenticate registration of the packet switched device.

The functions of the web server could be co-resident in the key server 34 or in the application server 30 if desired. For example, the Secure File Service may be an HTTP server process running co-resident on the application server 30 or on the key server 34. The Secure File Service may be the same process the Secure Web Service used for administering the application server 30, the key server 34 and Key generating agent process on the key server 34.

For FIG. 2A, there is no requirement that the application server 30 include the functions of the gatekeeper, gateway or even have web-based administration. The gatekeeper and gateway functions may reside on a separate server. As for the web-based administration for the key server 34 or application server 30, other forms of administration are possible, such as, using a graphical user interface (GUI) or a command line interface using a mouse or voice recognition to implement changes. As for the transfer of files, it does not need to be via HTTP but can be via any other protocol that can be secured and is understood by the application server 30 and packet switched devices 36, 37.

Figure 2D:
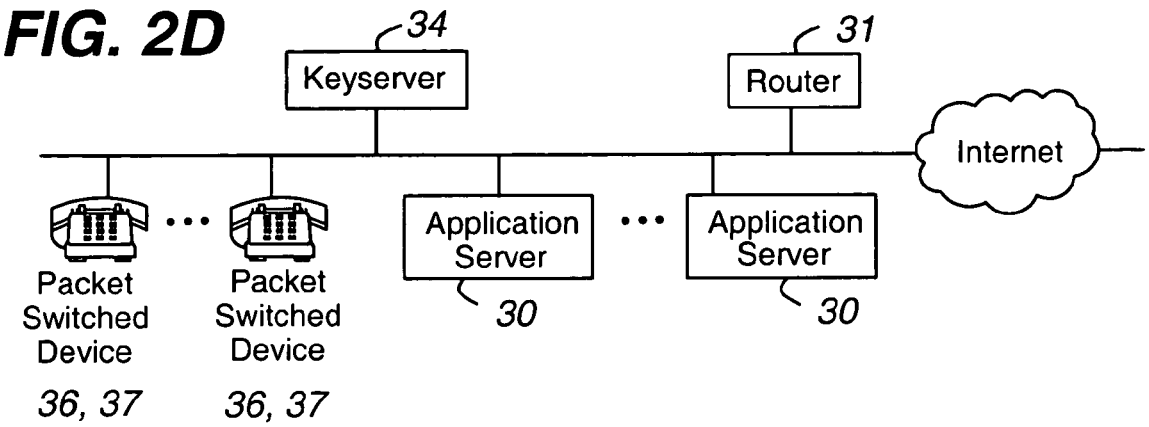
FIG. 2D is a block diagram according to an embodiment of the present invention.
Figure 2E:
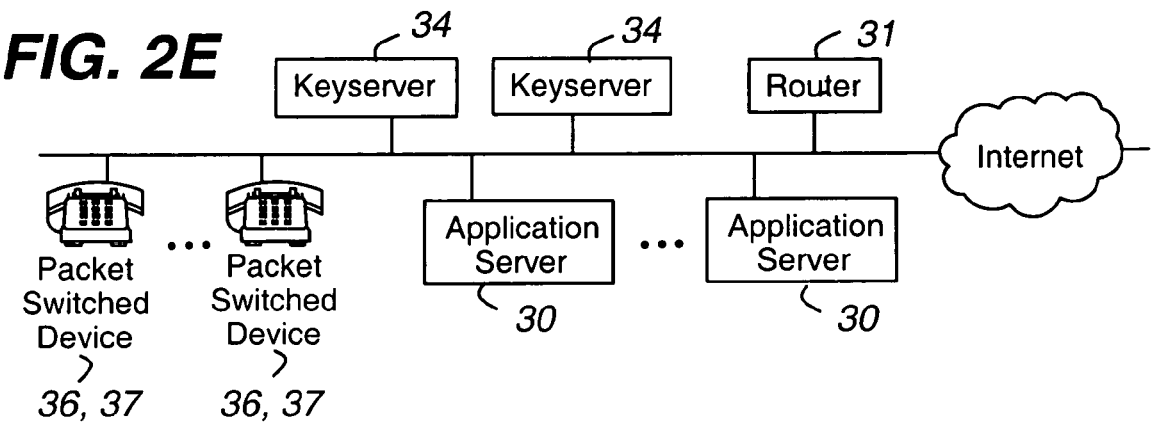
FIG. 2E is a block diagram according to an embodiment of the present invention.
Figure 2F:
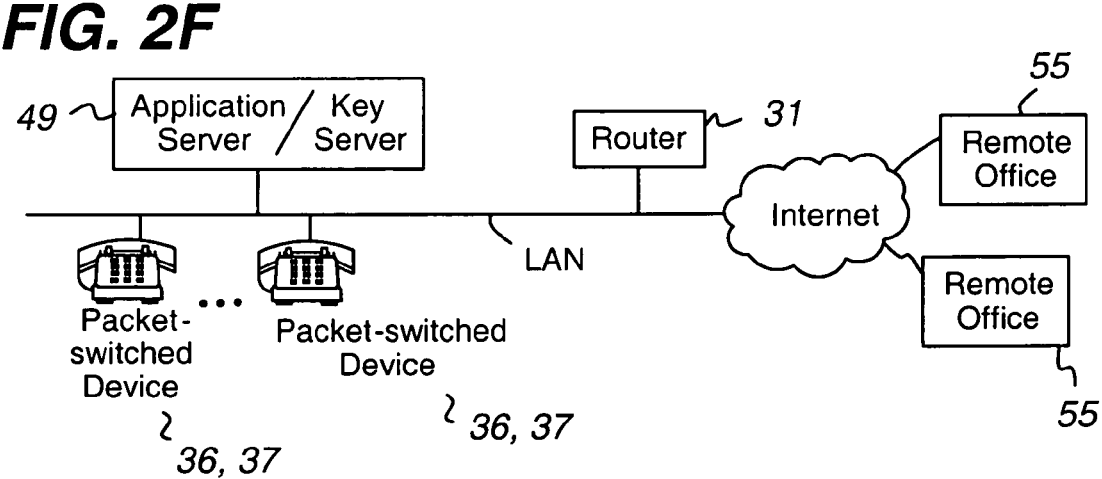
FIG. 2F is a block diagram according to an embodiment of the present invention.

For a small organization or enterprise, the functions of the web server 33 may be co-resident on the application server 30 or key server 34. Furthermore in small organizations, the functions of the key server 34 may be co-resident with the application server 30 depending on the processing power of the application server and system usage. Alternatively depending on the system usage, the key server 34 may remain on a separate server from the application server. FIGS. 2D, 2E and 2F are block diagrams for a second, third and fourth embodiment of the invention denoting the case where the functions of the web server 33 are co-resident on the application server 30 or key server 34.

For larger organizations (i.e., enterprises) that have multiple application servers 30 in a building, the needs of the organization may be met with a single key server 34 as shown in FIG. 2D. For high availability purposes or perhaps to improve system performance, multiple key servers 34 serve the key distribution needs of the multiple application servers 30 and packet switched devices 36, 37 as shown in FIG. 2E. One issue that arises in this case, is the need to administer the Key generating agent process operating on each key server 34. This includes entering the same Seed during the Key generating agent administration process on each key server 34 so that each Key generating agent process produces the same Enterprise Master Key, Km.

Finally there may be a need in a large organization that has several remote offices 55, to have an application server 49 with co-resident key server functionality in each of the remote offices 55 as shown in FIG. 2F. Where each of the remote offices 55 communicate via the router 31 and Internet. In this case, the key server functionality is co-resident with the application server 49 because the small number of users in each remote office 55. For high availability uses, if one application server 49 with co-resident key server functionality fails in a first remote office 55, it may be desirable to have a remote application server 49 or remote application server 30 and key server 34 in a second office 55 take over until operations are back to normal in the first remote office 55. Again, the need to administer the Key generating agent operating on application server 49 includes entering the same Seed during the Key generating agent administration process on each remote key server 34 so that each Key generating agent in the enterprise produces the same Enterprise Master Key, Km.

Figure 3:
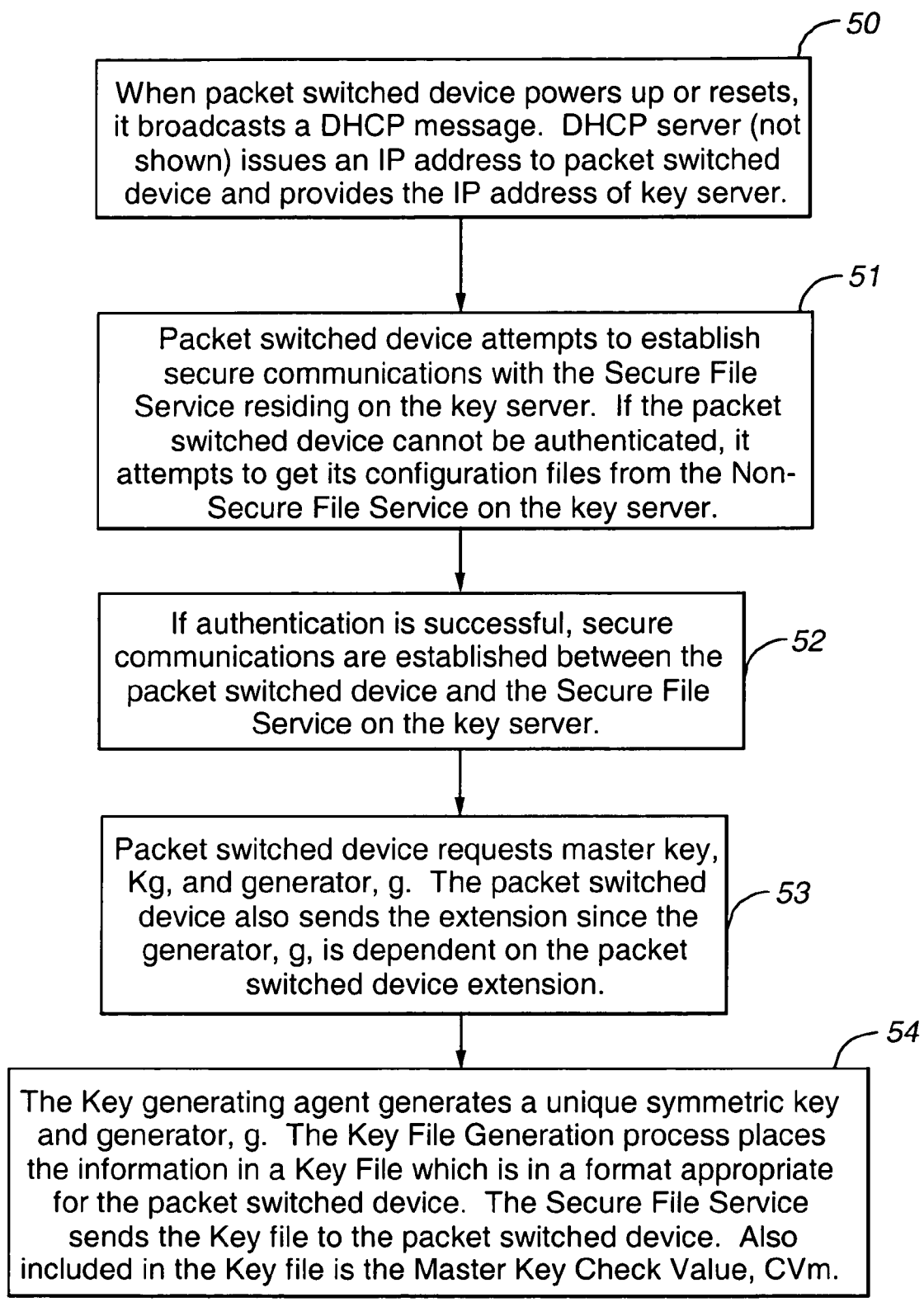
FIG. 3 is a flow chart of the initialization and key distribution process between a packet switched device and key generating agent according to an embodiment of the present invention.

FIG. 3 is a flow chart of the initialization and key distribution process between a packet switched device 36, 37 and key server 34. Note for flow charts in FIGS. 3 and 4, the Secure File Service is co-resident on the key server 34 rather than residing on the web server 33.

There are several system independent procedures listed in step 50. When the packet switched device 36, 37 powers up or resets, it broadcasts a DHCP DISCOVER message. A DHCP server (not shown) issues the packet switched device 36, 37 an IP address and the IP address of the server operating the Secure File Service in addition to other information. Alternatively, the packet switched device 36,37 may use a static IP address.

In step 51, the packet switched device 36, 37 attempts to establish a secure connection using a TLS Handshake protocol process using HTTP over TLS (HTTPS) as follows:

1. The packet switched device 36, 37 and Secure File Service on the key server 34 establish a logical connection using the HTTPS port 443 or any other designated port.

2. The packet switched device 36, 37 and Secure File Service exchange Hello messages to agree on security capabilities including cryptographic algorithms the client can support (such as RSA), the session ID ("SID"), TLS protocol version and 32 byte random numbers to seed the cryptographic calculation of the symmetric key (shared secret key).

3. The Secure File Service sends a Certificate message including the key server's (the key server 34 is operating the Secure File Service) public key certificate and the certificate authority's root certificate. The packet switched device 36, 37 can authenticate the server by authenticating the certificate chain, i.e., the public key and certificate authority's root certificate. Packet switched device 36, 37 has compiled in its software a copy of the Root Certificate Authority certificate which was downloaded and compiled during manufacture or at a later time, such as, during initial administration. The Secure File Service requests a Client Key Exchange message from the packet switched device 36, 37.

4. If the certificate chain is verified, the packet switched device 36, 37 sends the Client Key Exchange message. The Client Key Exchange message uses the public key contained in the server's public key certificate to encrypt the session key information (shared secret key) included in the message. The packet switched device 36,37 sends a ChangeCipherSpec message to activate the negotiated options for all messages the packet switched device 36, 37 will send. The packet switched device 36, 37 also sends a Finished message to let the Secure File Service verify the activated options.

5. The Secure File Service sends a ChangeCipher Spec message to activate the negotiated options for all messages the Secure File Service will send. The Secure File Service sends a Finished message to the packet switched device 36, 37 to notify the packet switched device 36, 37 it should verify the activated options.

In step 52 when the Secure File Service is authenticated, the packet switched device 36, 37 uses the SID to establish a secure communications channel using HTTP over TLS (HTTPS).

In step 53, the packet switch device 36, 37 requests the Packet Switched Master Key, Kg, and generator, g, from the Secure File Service. This is the beginning of the key distribution process between the packet switched device 36, 37 and the key server 34. The key distribution process is required if the packet switch device 36, 37 rebooted, manually logged out, changed extensions, or is brand new. The key distribution process is also required if the application server 30 determined that any portion of a previous registration request message is incorrect or too old and hence did not authorize the packet switched device's 36, 37 registration request.

If the key distribution process is required, the packet switched device prompts the user for an extension (EXT) and PIN. The EXT and PIN are stored for the moment in the packet switched device's 36, 37 volatile memory. Once the user replies, the packet switched device sends to the Secure File Service an HTTP GET for the URL formed by "https://" including the IP address of the Secure File Service, the Key file path name and file name "kkg.txt", and the packet switched device's extension. The extension or alternative unique identifier associated with the packet switched device 36, 37 may be sent to the key generating agent to derive g for this particular extension. In an alternative embodiment, the key generating agent may send to the packet switched device 36, 37 a g derived from information that is independent of the packet switched device. In step 54 upon receipt of the request, the Secure File Service passes the request to the Key File Generation process. The Key File Generation process obtains a unique shared symmetric key, Kg, and key identifier, g from the Key generating agent process. In an alternative embodiment, g may be computed by the packet switched device 36, 37 and sent as part of the request for the Packet Switched Master Key, Kg.

The Key generating agent process also computes a Master Key Check Value (CVm) for identification of the Enterprise Master Key, Km. The Key File generation process returns to the Secure File Service a Key File with the information in a format appropriate for the packet switched device 36, 37. The Secure File Service sends the Key File to the packet switched device 36, 37. The packet switched device 36, 37 stores Kg, g and CVm in non-volatile memory.

The packet switched device 36, 37 closes the secure connection, computes the Packet Switched Device Authentication Key, Ka, which is used to digitally sign messages between the packet switched device, 36, 37 and the application server 30. The packet switched device 36, 37 stores Ka in non-volatile memory.

Figure 4:
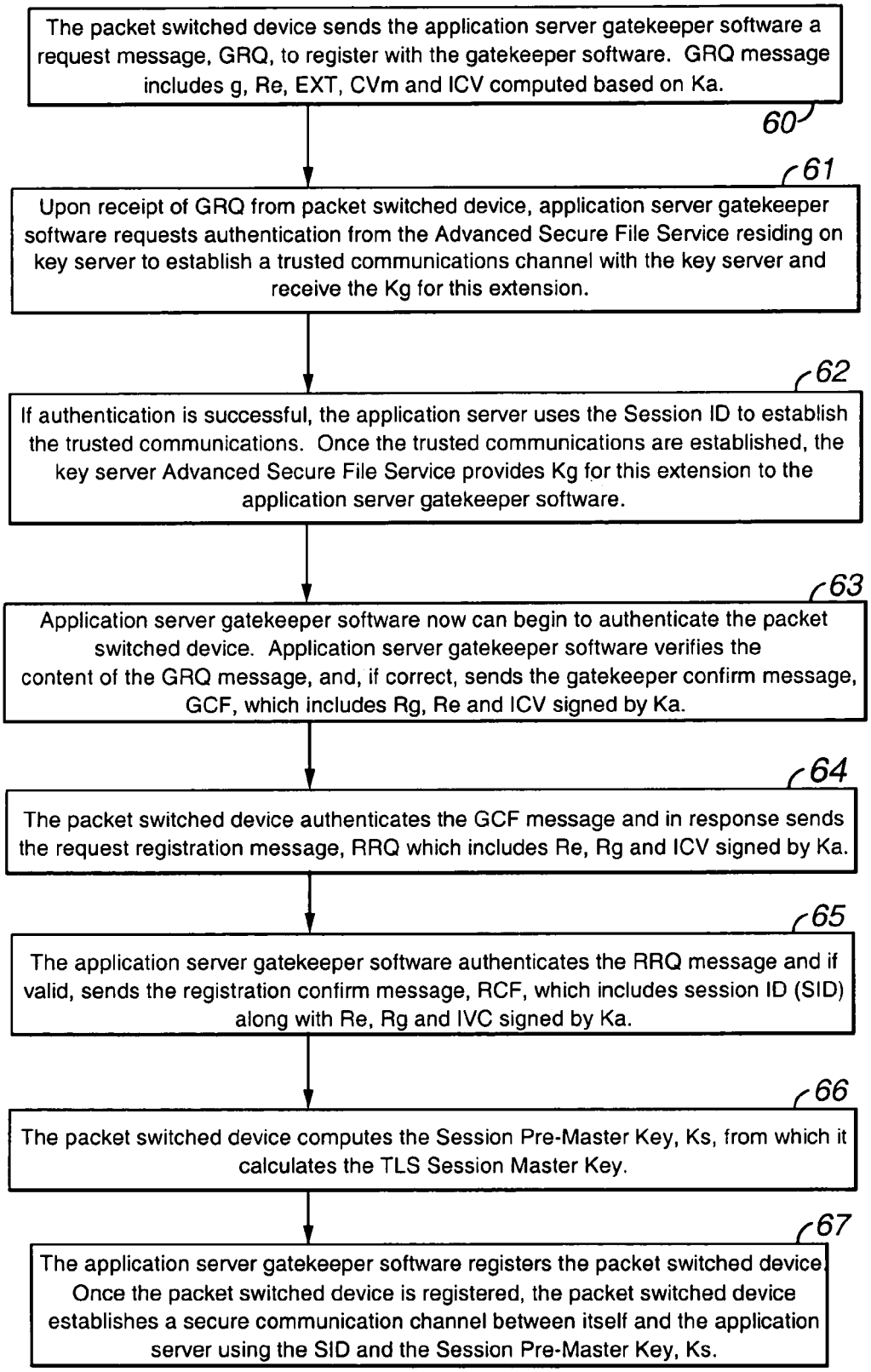
FIG. 4 is a flow chart of the key distribution process between a key generating agent and application server and the registration process between the application server and packet switched device.

FIG. 4 is a flow diagram of the key distribution process between key server 34 and application server 30 and the registration process between the application server 30 and packet switched device 36, 37. Note, if a packet switched device has a Packet Switched Device Authentication Key, Ka, generator, g, extension (EXT) and PIN in non-volatile memory, then it does not attempt the key distribution process first but instead tries to register first with the application server 30. If the registration process fails, for example due to an obsolete g and CVm because the Enterprise Master Key, Km, changed, the packet switched device should begin the key distribution process as shown in FIG. 3.

In step 60, the packet switched device 36, 37 connects to application server 30 RAS (registration, admission, status) port previously configured on the packet switched device 36, 37. The packet switched device 36, 37 sends the application server 30 a gatekeeper request message, GRQ, to register with the application server 30. The GRQ message includes generator, g, packet switched device 36, 37 random number, Re, the packet switched device 36, 37 extension, EXT, Master Key Check Value, CVm, and an Integrity Check Value, ICV, based on the Packet Switched Device Authentication Key, Ka. In an alternative embodiment, ICV may be based on Kg. Note that this authentication mechanism does not require the transmission of the Packet Switched Device Authentication Key or the PIN or combination thereof. Furthermore, this mechanism does not require the receipt of a challenge message from the Application Server before sending the GRQ message.

The Enterprise Master Key Check Value, CVm, provides the ability for the application server 30 to determine if the packet switched device is using a Packet Switched Device Master Key, Kg, that is derived from the correct Enterprise Master Key, Km. Furthermore, by computing an ICV using Ka, the packet switched device 36, 37 proves it knows the PIN for the extension (EXT) without having to send the PIN in the GRQ message. Note the GRQ message is sent in clear text but the messages are authenticated. Hence, a third party sniffing the clear text messages can not impersonate a packet switched device 36, 37. A third party can replay the message but cannot compute a new ICV.

In step 61, the key distribution process between the key server 34 and application server 30 begins. Upon receipt of the GRQ message from the packet switched device 36, 37, the application server 30 requests authentication from the Advanced Secure File Service on the key server 34 to establish a trusted communication channel and receive a Packet Switched Device Master Key, Kg associated with the generator, g, and extension (EXT) received in the GRQ message.

Establishing trusted communications between the application server 30 and the Advanced Secure File Service of the key server 34 allows for mutual authentication. The trusted communications process can be performed once as long as the session is maintained and reused. This trusted communications between the application server 30 and the key server 34 is via the HTTP over TLS (HTTPS) process as follows:

1. The application server 30 and Advanced Secure File Service operating on the key server 34 establish a logical connection using the HTTPS port 443 or any other designated port.

2. The application server 30 and Advanced Secure File Service exchange Hello messages to agree on security capabilities and parameters including cryptographic algorithms the client can support (such as RSA), the session ID ("SID"), protocol version and 32 byte random number to seed the cryptographic calculation of the symmetric key (shared secret key).

3. The Advanced Secure File Service sends a public key certificate in a Certificate message to the application server 30. The public key certificate includes the File Service's public key. The Advance Secure File Service sends a CertificateRequest message to notify the application server 30 the Advance Secure File Service wants to authenticate the application server 30. The CertificateRequest message includes a list of certificate types the key server 34 will accept and a list of certificate authorities the key server 34 will accept. The Advanced Secure File Service requests a Certificate from the application server 30 to prove knowledge of a related private key.

4. The application server 30 sends a Certificate message including the application server's public key certificate and the certificate authority's root certificate. The Advanced Secure File Service on the key server 34 can authenticate the application server 30 by authenticating the certificate chain, i.e., the public key and certificate authority's root certificate. The key server 34 and application server 30 have compiled in their software a copy of the Root Certificate Authority certificate, which was downloaded and compiled during initial administration. The Advanced Secure File Service requests a Client Key Exchange message from the application server 30. The application server 30 sends the Client Key Exchange message which includes the public key contained in the application server's 30 public key certificate to encrypt the session key information (shared secret key) included in the message.

5. The application server 30 also sends a CertificateVerify message, which authenticates the key information via a keyed cryptographic hash of the information exchanged in the handshake messages. This allows the Advanced Secure File Service to prove the application server 30 has the appropriate private key.

6. The application server 30 sends a ChangeCipherSpec message to activate the negotiated options for messages it will send to the Advanced Secure File Service. The application server 30 also sends a Finished message to notify the Advance Secure File Service to check the activated options.

7. The Advance Secure File Service sends a ChangeCipherSpec message to activate the negotiated options for messages it will send to the application server 30. The Advanced Secure File Service sends a Finished message to notify the application server 30 to check the activated options.

In step 62, if authentication is successful, the application server 30 uses the SID to establish the trusted communications. Once the trusted communication is established, the Key generating agent provides Kg associated with the generator, g, and extension (EXT) received by the application server 30 in the GRQ message in the following manner:

1. Upon receipt of the request, the Advanced Secure File Service passes the request to the Key File Generation process. The Key generating agent also computes a Master Key Check Value (CVm) to assure usage of the same Km. The Key File Generation process provides the unique symmetric key, Kg, for the particular identifier, g, sent by the application server 30. The Key File generation process returns to the Advanced Secure File Service a Key File with the information in a format appropriate for the application server 30. The Advanced Secure File Service sends the Key File to the application server 30.

2. The application server 30 optionally closes the trusted communication channel with the Advanced Secure File Service of the key server 34.

Step 63 continues the registration process between the packet switched device 36, 37 and the application server 30. The application server 30 verifies the contents of the received GRQ message now that it has the symmetric (secret key) key, Kg, from the Advanced Secure File Service. Once the GRQ message is authenticated, the application server 30 sends, via the RAS port, a gatekeeper confirm message, GCF, to the packet switched device 36, 37. The GCF message includes application server 30 nonce, Rg, and echoes the packet switched device nonce, Re, that the application server 30 received. The message also includes the integrity check value, ICV, computed based on Ka.

Note, the application server 30 nonce, Rg, is used to protect against replay attacks. Furthermore, echoing the packet switched device nonce, Re, proves to the packet switched device 36, 37 that the message is not a replay of an earlier application server 30 message. Signing the message using Ka, proves the application server 30 knows the packet switched device's PIN and the Enterprise Master Key, Km, from which Ka is derived.

In step 64, the packet switched device 36, 37 receives the GCF message and authenticates the message contents. If the contents are correct, the packet switched device 36, 37 sends a request registration message, RRQ to the application server 30. The RRQ includes the application server 30 nonce, Rg, the packet switched device nonce, Re and an ICV computed based on Ka. Note, the use of Rg confirms to the application server 30 that the message is not a replay of an earlier packet switched device 36, 37 message.

In step 65, the application server 30 authenticates the contents of the RRQ message and if valid, sends a registration confirm message, RCF. The RCF includes a session ID (SID), echoed Re, Rg and ICV computed based on Ka. Note that this authentication mechanism does not require the transmission of the Packet Switched Device Authentication Key or the PIN or combination thereof. Furthermore, this mechanism does not require the receipt of a challenge message from the Application Server before sending the GRQ message. Additionally, the strength of this authentication mechanism is based on the use of the strong symmetric key associated with the key identifier and as such is immune to an attack based on trying all possible symmetric keys.

In step 66, the packet switched device 36, 37 computes the Session Pre-Master Secret Key, Ks, from which it calculates the TLS session master key as described in RFC 2246. The TLS session master key is used to compute cryptographic data for the TLS session.

In step 67, the application server 30 registers the packet switched device 36, 37. Once the packet switched device 36, 37 is registered, the packet switched device 36, 37 establishes a TLS Signaling Channel connection using the Session ID (SID) received as part of the RCF message and the Session Pre-Master Secret, Ks. If registration is successful, the EXT, PIN and key information is stored in non-volatile memory (if different than what is already stored in non-volatile memory) of the packet switched device 36, 37 and registration is complete.

If registration fails due to an invalid EXT, a GRQ is sent to an alternate application server 30. However, if registration fails due to an invalid PIN, the packet switched device must request the end user to login again, begin the key distribution process and registration process again. If registration fails due to missing or invalid key information, the packet switched device must begin the key distribution process and registration process again.

If the application server 30 determines a replay is occurring, it should not respond to the packet switched device 36, 37. For example, if CVm is correct and the application server 30 knows the EXT and its PIN but the ICV value is incorrect, the application server 30 should not respond to the GRQ or any messages that follow. An incorrect ICV implies the packet was damaged or the packet switched device 36, 37 does not know its PIN or Ka.

If the application server 30 is providing redirection, that is, telling the packet switched device 36, 37 it is not the correct application server for this EXT, and the supplied Master Key Check Value, CVm, is current, then the application server 30 may return to the packet switched device 36, 37 a gatekeeper reject message, GRJ. The GRJ includes a list of alternate application servers 30 to contact, the packet switched device nonce, Re, and error information. The packet switched device 36, 37 receiving a GRJ should delay responding to the message for a reasonable amount of time because a valid GCF message may be returned and in order to avoid a denial of service attack based on fake GRJs.

If multiple unsuccessful login attempts are made from the same IP address, the application server 30 must ignore them to prevent an active PIN guessing attack against an extension.

A number of variations and modifications of the invention can be used. It would be possible to provide for some features of the invention without providing others.

For example in one alternative embodiment, the logic of the present invention is implemented as software, hardware (e.g., logic circuit), or as a combination thereof.

In another alternative embodiment, the key generating agent process is collocated with the application server.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for provisioning and registering a packet-switched communications device in an enterprise network, comprising:
    (a) providing an unprovisioned first packet-switched communications device in an enterprise network, the first packet-switched communications device having a corresponding unique identifier and an electronic address on the enterprise network;
    (b) as part of a provisioning process establishing, by the first packet-switched communications device, a secure communications session with a key generating agent in the enterprise network;
    (c) providing, to the key generating agent through the session, (i) when a key identifier is derived using the unique identifier associated with the first packet-switched communications device, the unique identifier or (ii) when the key identifier is derived using information not associated with the first packet-switched communications device, no unique identifier;
    (d) receiving, from the key generating agent through the session, (i) a secret key derived from an enterprise master key and a key identifier and (ii) the key identifier;
    (e) forwarding to an application server a registration request, wherein the registration request comprises the key identifier and wherein the first packet-switched communications device has a limited ability to communicate with a provisioned and registered second packet-switched communications device in the enterprise network until the first packet-switched communications device is successfully registered in step (g);
    (f) authenticating the first packet-switched communications device with the secret key or an authentication key derived therefrom; and
    (g) when the first packet-switched communications device is successfully authenticated, registering the first packet-switched communications device, wherein steps (b) through (e) occur after the first packet-switched communications device has been located at an end user's premises and wherein the first and second packet-switched communications device have different and unique secret keys and key identifiers.

2. The method of claim 1, wherein the key identifier is a function of at least one of a pseudo-random number generator, a database of keys and key identifiers, and a hash function and wherein the secret key is not in the possession of the first packet-switched communications device before step (d).

3. The method of claim 1, wherein the electronic address is a telephone extension, wherein the first packet-switched communications device possesses the secret key and the first packet-switched communications device is not in secure communications with the application server, and wherein the first packet-switched communications device provides the registration request to the application server using the key identifier.

4. The method of claim 1, further comprising before the establishing step:
    authenticating the key generating agent;
    performing the establishing, providing, and receiving steps when authenticating the key generating agent is successful.

5. The method of claim 1, wherein the secret key is a symmetric key and wherein authentication step (f) is performed using symmetric key cryptography.

6. The method of claim 1, wherein the secret key is derived from the enterprise master key, the key identifier, and at least one of an attribute associated with the key generating agent and the unique identifier.

7. The method of claim 6, wherein the enterprise master key is calculated using a seed value and a pseudorandom number generator, wherein the secret key is derived using the key generating agent attribute and unique identifier, wherein the attribute of key generating agent is an electronic address of the key generating agent and/or an electronic address of a server the key generating agent is resident on and wherein the unique identifier is the address of the first packet-switched communications device and/or a serial number associated with the first packet-switched communications device.

8. The method of claim 1, wherein the authentication key is used in authenticating step (f), wherein an integrity check value used in step (f) is a hashed message authentication code using the secret key, and wherein the authentication key is derived from the secret key of the first packet-switched communications device and an attribute of the first packet-switched communications device.

9. The method of claim 1, wherein the key identifier computed from the unique identifier comprises at least a first field, the first field comprising an identifier associated with the key generating agent, a second field comprising the identifier of the first packet-switched communications device, and a counter field.

10. The method of claim 9, wherein the unique identifier of the first packet-switched communications device is at least one of an extension on the enterprise network, a serial number, a user login identifier, and an address of the first packet-switched communications device on the enterprise network.

11. The method of claim 1, further comprising:
digitally signing a message, wherein a digital signature is derived from the secret key, a constant, and a personal identification number of a user associated with the first packet-switched communications device.

12. The method of claim 1, wherein a session pre-master secret is used, after step (g), by the first packet-switched communications device for establishing a secured session and wherein the pre-master secret is a function of the secret key, the unique identifier, a nonce value.

13. The method of claim 1, wherein the establishing step (b) comprises the sub-steps:
(B1) receiving a first IP address assigned to the first packet-switched communications device and a second IP address assigned to an enterprise server comprising the key generating agent;
(B2) the first packet-switched communications device authenticating the enterprise server using public cryptography techniques;
(B3) the first packet-switched communications device generating a second secret key;
(B4) the first packet-switched communications device encrypting the second secret key with a public key associated with the enterprise server; and
(B5) the first packet-switched communications device sending the encrypted second secret key to the enterprise server.

14. The method of claim 1, wherein the establishing step comprises:
establishing a logical connection with the key generating agent;
negotiating security parameters;
authenticating the identity of the key generating agent; and
when authentication is successful, activating the negotiated security parameters to establish the secured communications session.

15. The method of claim 4, further comprising:
when authentication is successful, establishing secure communications.

16. The method of claim 1, wherein the providing step comprises prompting a user associated with the first packet-switched communications device for a personal identification number and unique identifier.

17. The method of claim 1, wherein the first packet-switched communications device provides to the key generating agent through the session, the key identifier when the first packet-switched communications device computes the key identifier.

18. The method of claim 1, further comprising:
closing the secured session; and
computing a packet switched device authentication key using the secret key.

19. The method of claim 1, wherein the step of authenticating further comprising:
when authentication is successful, establishing secure communication with the first packet-switched communications device.

20. A computer readable medium comprising processor executable instructions to perform the steps of claim 1.

21. The method of claim 1, wherein the establishing, providing and receiving steps are free of a challenge message and a response thereto.

22. An enterprise network including a first packet-switched communications device having a corresponding unique identifier and an electronic address on the enterprise network, the first packet-switched communications device comprising:
a first processor in the packet-switched communications device operable to:
(A1) establish, as part of a provisioning process, a secure communications session with a key generating agent in the enterprise network;
(A2) provide, to the key generating agent through the session, (i) when a key identifier is derived using a unique identifier associated with the first packet-switched communications device, the unique identifier or (ii) when the key identifier is derived using information not associated with the first packet-switched communications device, no unique identifier;
(A3) receive, from the key generating agent through the session, (i) a secret key derived from a key identifier and an enterprise master key and (ii) the key identifier;
(A4) forward to an application server a registration request, wherein the registration request comprises the key identifier and wherein the first packet-switched communications device has a limited ability to communicate with a provisioned and registered second packet-switched communications device in the enterprise network until the first packet-switched communications device is successfully registered in operation (B2); and wherein the application server comprises a second processor that is operable to:
(B1) authenticate the communications device with the secret key or an authentication key derived therefrom; and
(B2) when the communications device is successfully authenticated, register the communications device, wherein operations (A1) through (B1) occur after the first packet-switched communications device has been located at an end user's premises and wherein the first and second packet-switched communications device have different and unique secret keys and key identifiers.

23. The enterprise network of claim 22, wherein the key identifier is a function of at least one of a pseudo-random number generator, a database of keys and key identifiers, and a hash function and wherein the secret key is not in the possession of the first packet-switched communications device before operation (A3).

24. The enterprise network of claim 22, wherein the electronic address is a telephone extension, wherein the first packet-switched communications device possesses the secret key and the first packet-switched communications device is not in secure communications with the application server, and wherein the first packet-switched communications device provides the registration request to the application server using the key identifier.

25. The enterprise network of claim 22, further comprising, before the establishing operation (A1), the sub-operations of:
(i) authenticating the key generating agent;
(ii) performing the establishing, providing, and receiving operations when authenticating the key generating agent is successful.

26. The enterprise network of claim 22, wherein the secret key is a symmetric key and wherein authentication operation (B1) is performed using symmetric key cryptography.

27. The enterprise network of claim 22, wherein the secret key is derived from the enterprise master key, the key identifier, and at least one of an attribute associated with the key generating agent and the unique identifier.

28. The enterprise network of claim 27, wherein the enterprise master key is calculated using a seed value and a pseudo-random number generator, wherein the secret key is derived using the key generating agent attribute and unique identifier, wherein the attribute of key generating agent is an electronic address of the key generating agent and/or an electronic address of a server the key generating agent is resident on and wherein the unique identifier is the address of the first packet-switched communications device and/or a serial number associated with the first packet-switched communications device.

29. The enterprise network of claim 22, wherein the authentication key is used in authenticating operation (B1), wherein an integrity check value used in operation (B1) is a hashed message authentication code using the secret key, and wherein the authentication key is derived from the secret key of the first packet-switched communications device and an attribute of the first packet-switched communications device.

30. The enterprise network of claim 22, wherein the key identifier computed from the unique identifier comprises at least a first field, the first field comprising an identifier associated with the key generating agent, a second field comprising the identifier of the communications device, and a counter field.

31. The enterprise network of claim 30, wherein the unique identifier of the first packet-switched communications device is at least one of an extension on the enterprise network, a serial number, a user login identifier, and an address of the first packet-switched communications device on the enterprise network.

32. The enterprise network of claim 22, further comprising the operation of:
digitally signing a message, wherein a digital signature is derived from the secret key, a constant, and a personal identification number of a user associated with the first packet-switched communications device.

33. The enterprise network of claim 22, wherein a session pre-master secret is used, after operation (B2), by the first packet-switched communications device for establishing a secured session and wherein the pre-master secret is a function of the secret key, the unique identifier, a nonce value.

34. The enterprise network of claim 22, wherein the establishing operation (A1) comprises the sub-operations:
(A1i) receiving a first IP address assigned to the first packet-switched communications device and a second IP address assigned to the application server comprising the key generating agent;
(A1ii) the first packet-switched communications device authenticating the application server using public cryptography techniques;
(A1iii) the first packet-switched communications device generating a second secret key;
(A1iv) the first packet-switched communications device encrypting the second secret key with a public key associated with the application server; and
(A1v) the first packet-switched communications device sending the encrypted second secret key to the application server.

35. The enterprise network of claim 22, wherein the establishing operation (A1) comprises the sub-operations:
establishing a logical connection with the key generating agent;
negotiating security parameters;
authenticating the identity of the key generating agent; and
when authentication is successful, activating the negotiated security parameters to establish the secured communications session.

36. The enterprise network of claim 25, further comprising the operation by the second processor of:
(B3) when authentication is successful, establishing secure communications.

37. The enterprise network of claim 22, wherein the a user associated with the first packet-switched communications device is prompted by the processor for a personal identification number and unique identifier.

38. The enterprise network of claim 22, wherein the first packet-switched communications device provides to the key generating agent through the session, the key identifier when the first packet-switched communications device computes the key identifier.

39. The enterprise network of claim 22, further comprising the operations of:
closing the secured session; and
computing a packet switched device authentication key using the secret key.

40. The enterprise network of claim 22, wherein the authentication operation (B1) comprises the sub-operation of:
when authentication is successful, establishing secure communication with the communications device.

41. A method for provisioning and registering a packet-switched communications device in an enterprise network, comprising:
(a) assigning an electronic address to a first communications device;
(b) providing the electronic address and an address associated with a key generating agent to the first communications device;
(c) authenticating, by the first communications device, the key generating agent; and
(d) when authentication of the key generating agent is successful, performing the following additional steps:
(e) establishing, as part of a provisioning process, a secure communications session between the first communications device and the key generating agent, wherein the first communications device has a corresponding unique identifier;
(f) providing the unique identifier to the key generating agent through the secure communications session;
(g) receiving, from the key generating agent through the session, (i) a secret key derived from an enterprise master key, the unique identifier, and a key identifier and (ii) the key identifier;
(h) forwarding to an application server a registration request, wherein the registration request comprises the key identifier and wherein the first communications device has a limited ability to communicate with a provisioned and registered second packet-switched communications device in the enterprise network until the first communications device is successfully registered in step (j);
(i) authenticating the first communications device with the secret key or an authentication key derived therefrom; and
(j) when the first communications device is successfully authenticated, registering the first communications device, wherein steps (e) through (j) occur after the first communications device has been located at an end user's premises and wherein the first and second packet-switched communications device have different and unique secret keys and key identifiers.

42. The method of claim 41, wherein the key identifier is a function of at least one of a pseudo-random number generator, a database of keys and key identifiers, and a hash function and wherein the secret key is not in the possession of the first communications device before step (g).

43. The method of claim 41, wherein the electronic address is a telephone extension, wherein the first communications device possesses the secret key and the first communications device is not in secure communications with the application server, and wherein the first communications device provides the registration request to the application server using the key identifier.

44. The method of claim 41, wherein the secret key is a symmetric key and wherein authentication step (i) is performed using symmetric key cryptography.

45. The method of claim 41, wherein the secret key is derived from the enterprise master key, the key identifier, and at least one of an attribute associated with the key generating agent and the unique identifier.

46. The method of claim 44, wherein the enterprise master key is calculated using a seed value and a pseudo-random number generator, wherein the secret key is derived using the key generating agent attribute and unique identifier, wherein the attribute of key generating agent is an electronic address of the key generating agent and/or an electronic address associated with the key generating agent, and wherein the unique identifier is the address of the first communications device and/or a serial number associated with the first communications device.

47. The method of claim 41, wherein the authentication key is used in authenticating step (i), wherein an integrity check value used in step (i) is a hashed message authentication code using the secret key, and wherein the authentication key is derived from the secret key of the first communications device and an attribute of the first communications device.

48. The method of claim 41, wherein the key identifier computed from the unique identifier comprises at least a first field, the first field comprising an identifier associated with the key generating agent, a second field comprising the identifier of the first communications device, and a counter field.

49. The method of claim 48, wherein the unique identifier of the first communications device is at least one of an extension on the enterprise network, a serial number, a user login identifier, and an address of the first communications device on the enterprise network.

50. The method of claim 41, further comprising:
(k) digitally signing a message, wherein a digital signature is derived from the secret key, a constant, and a personal identification number of a user associated with the first communications device.

51. The method of claim 41, wherein a session pre-master secret is used, after step (g), by the first communications device for establishing a secured session and wherein the pre-master secret is a function of the secret key, the unique identifier, a nonce value.

52. The method of claim 41, wherein the establishing step (e) comprises the sub-steps:

(E1) receiving a first IP address assigned to the first communications device and a second IP address assigned to an enterprise server comprising the key generating agent;
(E2) the first communications device authenticating the enterprise server using public cryptography techniques;
(E3) the first communications device generating a second secret key;
(E4) the first communications device encrypting the second secret key with a public key associated with the enterprise server; and
(E5) the first communications device sending the encrypted second secret key to the enterprise server.

53. The method of claim 41, wherein the establishing step (e) comprises:
(E1) establishing a logical connection with the key generating agent;
(E2) negotiating security parameters;
(E3) authenticating the identity of the key generating agent; and
(E4) when authentication is successful, activating the negotiated security parameters to establish the secured communications session.

54. The method of claim 41, wherein the providing step comprises prompting a user associated with the first communications device for a personal identification number and unique identifier.

55. The method of claim 41, wherein the first communications device provides to the key generating agent through the session, the key identifier when the first communications device computes the key identifier.

56. The method of claim 41, further comprising:
(k) closing the secured session; and
(l) computing a packet switched device authentication key using the secret key and wherein the step of authenticating further comprising:
when authentication is successful, establishing secure communication with the first communications device.

57. A computer readable medium comprising processor executable instructions to perform the steps of claim 41.

58. A method, comprising:
(a) requesting, by an unprovisioned and unregistered first communications device, a first electronic address to be assigned to the first communications device and a second electronic address associated with a key generating agent;
(b) receiving, by the first communication device, the first and second electronic addresses;
(c) thereafter contacting and authenticating, by the first communications device, the key generating agent;
(d) when authentication of the key generating agent is successful, establishing, by the first communications device and as part of a provisioning process, a secure communications session with the key generating agent, wherein the first communications device has a corresponding unique identifier;
(e) providing the unique identifier to the key generating agent through the secure communications session;
(g) receiving, from the key generating agent through the session, a secret key derived from an enterprise master key, the unique identifier, and a key identifier;
(h) forwarding, to an application server, a registration request, wherein the registration request comprises the key identifier and wherein the unregistered first communications device has a limited ability to communicate with a provisioned and registered second packet-switched communications device in the enterprise network until the first communications device is successfully registered; and (i) when the application server, has successfully authenticated the first communications device using the secret key or an authentication key derived therefrom, registering the first communications device, wherein steps (a) through (i) occur after the first communications device has been located at an end user's premises and wherein the first and second packet-switched communications devices have different and unique secret keys and key identifiers.

59. The method of claim 58, wherein the key identifier is a function of at least one of a pseudo-random number generator, a database of keys and key identifiers, and a hash function, wherein the secret key is not in the possession of the first communications device before step (g), wherein the electronic address is a telephone extension, wherein the secret key is a symmetric key, wherein authentication of the first communication device is performed by the application server using symmetric key cryptography, wherein the enterprise master key is calculated using a seed value and a pseudo-random number generator, wherein the secret key is derived using a key generating agent attribute and unique identifier, wherein the unique identifier is the first electronic address of the first communications device and/or a serial number associated with the first communications device, wherein the authentication key and integrity check value are used by the application server in authenticating the first communications device, wherein the integrity check value is a hashed message authentication code using the secret key, wherein the authentication key is derived from the secret key of the first communications device and an attribute of the first communications device, and wherein the key identifier computed from the unique identifier comprises at least a first field, the first field comprising an identifier associated with the key generating agent, a second field comprising the unique identifier of the first communications device, and a counter field.

60. The method of claim 58, wherein step (c) comprises the sub-steps:

(C1) the first communications device authenticating the application server using public cryptography techniques;

(C2) the first communications device generating a second secret key;

(C3) the first communications device encrypting the second secret key with a public key associated with the application server; and (C4) the first communications device sending the encrypted second secret key to the application server.

61. A computer readable medium comprising processor executable instructions to perform the steps of claim 58.

* * * * *